United States Patent
Zeng et al.

(10) Patent No.: US 11,523,117 B2
(45) Date of Patent: Dec. 6, 2022

(54) ENCODER USING CODING TREE UNIT LEVEL ADAPTIVE QUANTIZATION MODE TO ADJUST FRAME LEVEL QUANTIZATION PARAMETER AND ASSOCIATED SIGNAL PROCESSING METHOD

(71) Applicant: Realtek Semiconductor Corp., HsinChu (TW)

(72) Inventors: Weimin Zeng, Milpitas, CA (US); Chi-Wang Chai, Cupertino, CA (US); Wei Li, Suzhou (CN); QingXi He, Suzhou (CN); Wujun Chen, Suzhou (CN); Rong Zhang, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/207,771

(22) Filed: Mar. 22, 2021

(65) Prior Publication Data

US 2022/0303538 A1 Sep. 22, 2022

(51) Int. Cl.
*H04N 19/124* (2014.01)
*H04N 19/142* (2014.01)
(Continued)

(52) U.S. Cl.
CPC ......... *H04N 19/124* (2014.11); *H04N 19/142* (2014.11); *H04N 19/159* (2014.11); *H04N 19/176* (2014.11); *H04N 19/1883* (2014.11)

(58) Field of Classification Search
CPC ... H04N 19/124; H04N 19/176; H04N 19/142
See application file for complete search history.

(56) References Cited

U.S. PATENT DOCUMENTS

2005/0175093 A1\* 8/2005 Haskell ................ H04N 19/152
375/240.03
2014/0098856 A1\* 4/2014 Gu ......................... H04N 19/61
375/240.03

(Continued)

FOREIGN PATENT DOCUMENTS

CN 102647586 A 8/2012
CN 109076212 A 12/2018

OTHER PUBLICATIONS

Bin Li, Houqiang Li, Li Li, Jinlei Zhang, Joint Collaborative Team on Video Coding (JCT-VC) of ITU-T SG 16 WP 3 and ISO/IEC JTC 1/SC 29/WG 11 11th Meeting, Rate control by R-lambda model for HEVC, Oct. 10, 2012, 11, JCTVC-K0103, University of Science and Technology of China, Shanghai, CN.

(Continued)

*Primary Examiner* — Zhubing Ren
(74) *Attorney, Agent, or Firm* — Winston Hsu

(57) ABSTRACT

An encoder includes a frame level processing circuit, a coding tree unit (CTU) level processing circuit and an encoding circuit. The frame level processing circuit is arranged to calculate a bit number of a current frame according a target bitrate and a frame rate, and the frame level processing circuit is further arranged to calculate a quantization parameter of the current frame according to the bit number of the current frame and at least one parameter. The CTU level processing circuit is arranged to use an adaptive quantization mode to adjust the quantization parameter to generate an adjusted quantization parameter. The encoding circuit is arranged to encode the current frame to generate output data according to the adjusted quantization parameter.

8 Claims, 2 Drawing Sheets

(51) Int. Cl.
H04N 19/176 (2014.01)
H04N 19/169 (2014.01)
H04N 19/159 (2014.01)

(56) References Cited

U.S. PATENT DOCUMENTS

2014/0254660 A1* 9/2014 La .................. H04N 19/114
375/240.02
2015/0373328 A1* 12/2015 Yenneti ............ H04N 19/31
375/240.03
2019/0028710 A1* 1/2019 Fu .................. H04N 19/172
2020/0260083 A1* 8/2020 Helmrich ......... H04N 19/182

OTHER PUBLICATIONS

Bin Li, Houqiang Li, Li Li, Jinlei Zhang, Joint Collaborative Team on Video Coding (JCT-VC) of ITU-T SG 16 WP 3 and ISO/IEC JTC 1/SC 29/WG 11 11th Meeting, Rate control by R-lambda model for HEVC, Oct. 10, 2012, 26, JCTVC-K0103, University of Science and Technology of China, Shanghai, CN.

* cited by examiner

ENCODER USING CODING TREE UNIT LEVEL ADAPTIVE QUANTIZATION MODE TO ADJUST FRAME LEVEL QUANTIZATION PARAMETER AND ASSOCIATED SIGNAL PROCESSING METHOD

BACKGROUND OF THE INVENTION

1. Field of the Invention

The present invention is related to bitrate control of an encoder.

2. Description of the Prior Art

The operations of bitrate control in an encoder can generally be divided into a constant bitrate (CBR) and a variable bitrate (VBR), wherein the CBR means that the output bitrate of the encoder is a fixed value, to facilitate transmission over a channel with a limited bandwidth. However, if an image with high image complexity is encoded, the image quality will be sacrificed due to the limitation of the output bitrate. The VBR means that the output bitrate of the encoder will be adjusted according to the signal complexity of the input source, to maintain the quality of the output image. However, the output bitrate of the encoder cannot be determined, which causes problems in subsequent signal transmission and processing.

Regarding the control method of the CBR encoding, in 2012, the target bitrate and the Lagrangian operator (hereinafter referred to as R-λ) model was proposed, and the related video coding technology was also proposed at the Joint Collaborative Team on Video Coding (JCT-VC) meeting. In the architecture of the R-λ model, the Lagrangian operator (λ) used for related calculation of the distortion and optimization of the image signal is mainly calculated according to the target bitrate, and the quantization parameter is finally calculated according to the Lagrangian operator, to achieve the purpose of controlling the output bitrate. However, the calculation method of the above-mentioned R-λ model is very complicated, involving many exponential and logarithmic calculations, and the calculation of the Lagrangian operator is difficult to be implemented with a hardware circuit, which causes difficulties in the circuit design of the encoder.

SUMMARY OF THE INVENTION

One of the objectives of the present invention is to provide a bitrate control method employed by an encoder. Since the R-λ model is simplified and related VBR models are used, the aforementioned problems can be solved.

In an embodiment of the present invention, an encoder is provided. The encoder includes a frame level processing circuit, a coding tree unit (CTU) level processing circuit, and an encoding circuit. The frame level processing circuit is arranged to calculate a bit number of a current frame according a frame rate and a target bitrate of the encoder, and then calculate a quantization parameter of the current frame according to the bit number of the current frame and at least one parameter; the CTU level processing circuit is arranged to use an adaptive quantization mode to adjust the quantization parameter to generate an adjusted quantization parameter; and the encoding circuit is arranged to encode the current frame to generate an output data according to the adjusted quantization parameter.

In another embodiment of the present invention, a signal processing method applied in an encoder is provided, which comprises the following steps: according to a frame rate and a target bitrate of the encoder, calculating a bit number of a current frame, and then according to the bit number of the current frame and at least one parameter, calculating a quantization parameter of the current frame; using an adaptive quantization mode to adjust the quantization parameter to generate an adjusted quantization parameter; and according to the adjusted quantization parameter, encoding the current frame to generate an output data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
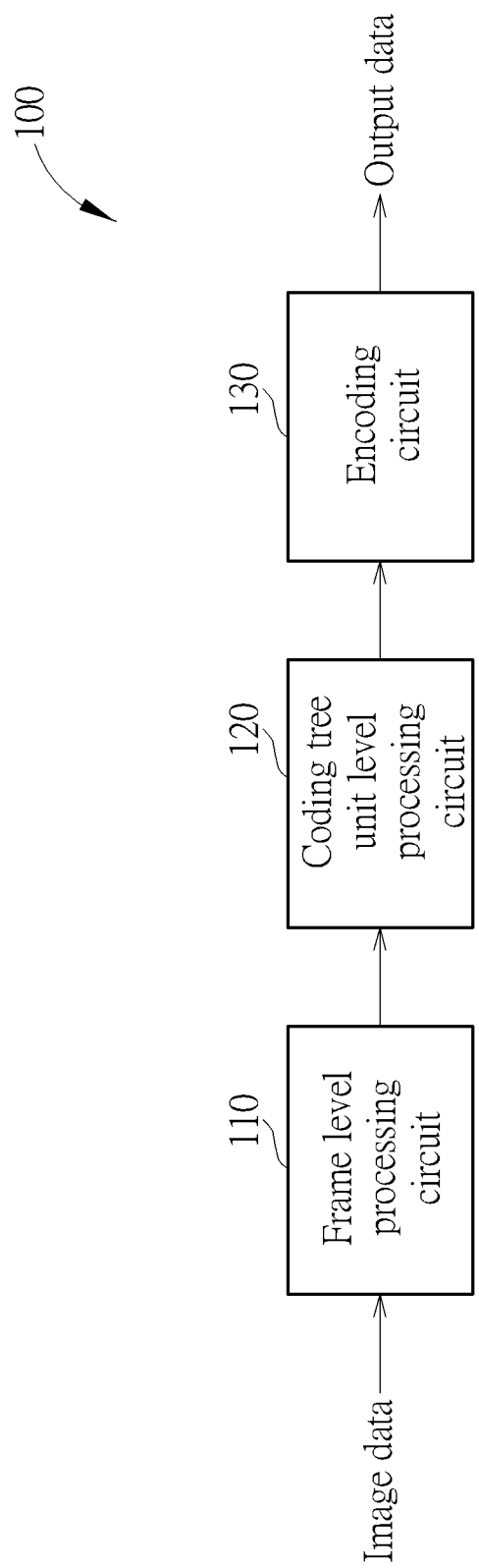
FIG. 1 is a diagram illustrating an encoder according to an embodiment of the present invention.

FIG. 1 is a diagram illustrating an encoder 100 according to an embodiment of the present invention. As shown in FIG. 1, the encoder 100 includes a frame level processing circuit 110, a coding tree unit (CTU) level processing circuit 120, and an encoding circuit 130. In this embodiment, the encoder 100 can be used in any electronic device that needs image compression. For example, the encoder 100 can be set in a set-top box, and can be arranged to receive an image data of an input source, and then generate an output image data to the television for decoding and playback.

In this embodiment, the frame level processing circuit 110 and the CTU level processing circuit 120 are arranged to control the output bitrate, and the frame level processing circuit 110 and the CTU level processing circuit 120 are arranged to perform simplification and improvement operation on the basis of the R-λ model, to generate and output the quantization parameter to the back-end encoding circuit 130 for encoding operation. It should be noted that, since the details of the encoding circuit 130 using the quantization parameter to encode the image data are well known to those skilled in the art, and the operation of the encoding circuit 130 is not the focus of the present invention, only the operations of the frame level processing circuit 110 and the CTU level processing circuit 120 are described in the specification of the present invention.

In the operation of the frame level processing circuit 110, for the IPPP encoding structure of the low-delay P-frame (LDP), there are two different calculation methods for the intra frame (I frame) and the predicted frame (P frame). Specifically, the frame level processing circuit 110 first calculates the average bitrate of each frame, and the calculation formula is as follows:

$$R_{picavg} = \frac{R_{tar}}{fps}; \quad (1)$$

wherein '$R_{picavg}$' is the average bitrate of each frame, '$R_{tar}$' is the target bitrate, and 'fps' is the frame rate. Then, the frame level processing circuit 110 calculates the average bit number of each frame, and the calculation formula is as follows:

$$T_{avgpic} = \frac{R_{picavg} * (N_{coded} + SW) - R_{coded}}{SW}; \quad (2)$$

wherein 'SW' is the size of the smooth window, '$N_{coded}$' is the number of frames that have been encoded, and '$R_{coded}$' is the bitrate that has been consumed. In this embodiment, 'SW' is arranged to make the output data outputted by the encoder 100 have a smoother bitrate change, and 'SW' can be any suitable constant, such as 30, 40.

Then, if the frame level processing circuit 110 is currently processing the I frame, the frame level processing circuit 110 uses the following formulas to calculate the quantization parameter:

$$\tau = \sum_{n=0}^{numberofblks} \sum_{x=0}^{x=7} \sum_{y=0}^{y=7} |H(x, y)|; \quad (3)$$

$$T_{bitsI} = \alpha * \left(\frac{4.0f * \tau}{T_{avgpic}}\right)^{0.582f} * T_{avgpic} + 0.5f; \quad (4)$$

$$QP_I = \quad (5)$$

$$4.5f * \left(\ln\left(\frac{\alpha}{256.0f}\right) - \beta * \left(\ln\left(\frac{T_{bitsI}}{w*h}\right) + \ln\left(\frac{\tau}{w*h}\right)^{1.2514f}\right)\right)^\beta + 18.7122f;$$

wherein in the formula (3), the I frame is divided into multiple blocks each having 8*8 pixels), 'numberofblks' is the number of blocks of the I frame, H(x,y) is the Hadamard transformation, and 'τ' is a sum of intra costs of all blocks in the I frame; in the formula (4), '$T_{bitsI}$' is the bit number allocated to the I frame, 'f' is the floating point, and 'α' is a parameter; in the formula (5), 'w' is the width of the I frame, 'h' is the height of the I frame, and 'β' is a parameter.

'$QP_I$' calculated by the above-mentioned formula (5) is the quantization parameter of the I frame. On the other hand, 'α' and 'β' in the above-mentioned formulas (4) and (5) are continuously updated with the encoding process of the frame. Specifically, in the R-λ model, the Lagrangian operator 'λ' is calculated according to '$T_{bitsI}$', 'α', and 'β'. Since the actual number of bits of the I frame will be different from '$T_{bitsI}$' when the encoder 100 finishes encoding the I frame, 'α' and 'β ' will be updated accordingly for use in encoding the next I frame. Since 'α' and 'β' are understood by those who are familiar with the R-λ model, the details of updating 'α' and 'β' will not be repeated here.

On the other hand, if the frame level processing circuit 110 is currently processing the P frame, the frame level processing circuit 110 uses the following formula to calculate the quantization parameter:

$$QP_p = 4.8f * \left(\beta * \left(\ln\left(\frac{T_{avgpic}}{w*h}\right) + \ln(\alpha)\right)\right) + 13.7122f; \quad (6)$$

'$QP_p$' calculated in the above-mentioned formula (6) is the quantization parameter of the P frame. On the other hand, 'α', 'β' in the above-mentioned formula (6) are continuously updated with the encoding process of the frame.

Then, in the operation of the CTU level processing circuit 120, for the first frame, the average energy and the quantization parameter adjustment radix of each block (i.e. the CTU block) in the frame are calculated first, wherein the size of the block can be 8*8 pixels, 16*16 pixels, or any other suitable size. The average energy and the quantization parameter adjustment radix of the block of the first frame can be a default value, and examples of the calculation formulas are as follows:

$$\text{avgEnergy} = 3.39f \quad (7);$$

$$\text{avgAdj} = 2.28f \quad (8);$$

wherein 'avgEnergy' is the average energy of the block of the frame, and 'avgAdj' is an average radix of the quantization parameter adjustment of the block of the frame.

For the calculation method of the subsequent frame, the CTU level processing circuit 120 uses the average energy and the quantization parameter adjustment radix of the previous frame and the energy of the block of the current frame to calculate the quantization parameter adjustment radix of the block of the current frame. An example of the calculation formula is as follows:

$$qpAdj\_i = \text{avgEnergy} * (\text{energy}\_i - \text{avgAdj}) \quad (9);$$

wherein 'qpAdj_i' is the quantization parameter adjustment radix of the block of the current frame, 'energy_i' is the energy of the block of the current frame, and can be obtained by calculating the sum of squares of the pixel values in the block, 'avgEnergy' is the average energy of the block of the previous frame, and 'avgAdj' is the average radix of the quantization parameter of the block of the previous frame.

Then, for each block, the CTU level processing circuit 120 calculates the adjusted quantization parameter for use by the encoding circuit 130, wherein an example of the calculation method of the adjusted quantization parameter is as follows:

$$QP_{lcu} = \text{base } QP + \text{Table[base } QP] * qpAdj\_i \quad (10);$$

where '$QP_{lcu}$' is the adjusted quantization parameter, 'baseQP' is the quantization parameter calculated by the frame level processing circuit 110, that is, if the frame currently being processed is the I frame, 'baseQP' is '$QP_I$' calculated in the formula (5); and if the frame currently being processed is the P frame, 'baseQP' is '$QP_p$' calculated in the formula (6); 'Table[baseQP]' represents a corresponding value obtained by looking up the table according to 'baseQP', which can represent parameters calculated according to 'baseQP' under different target bitrates.

It should be noted that, the values of floating-point numbers in the above formulas (4), (5), (6), (7), and (8) are for illustrative purposes only, and are not the limitations of the present invention, that is, designers can set these relevant values by themselves.

With reference to the above embodiment, the frame level processing circuit 110 is mainly responsible for controlling the encoding circuit 130 to output encoded data with a constant bitrate, and simplifies the process of calculating the quantization parameter. As a result, the complexity of the hardware circuit can be reduced. In addition, the quantization parameter is adjusted (i.e. adaptive quantization) through the CTU level processing circuit 120, so that the encoding circuit 130 can output higher quality image data, to solve the problem of image quality degradation caused by the use of a constant bitrate in the prior art. Furthermore, the CTU level processing circuit 120 uses a portion of the data that has been encoded (i.e. the energy and the quantization parameter adjustment radix of the block of the previous frame) when calculating the quantization parameter adjustment radix, thereby avoiding the pipeline delay of the hardware circuit.

In an embodiment of the present invention, the frame level processing circuit 110 or the CTU level processing circuit 120 further determines the difference between the current frame and the previous frame, to determine whether the image data involves scene change. For example, the CTU level processing circuit 120 can check the difference between at least one block (CTU block) of the current frame and the corresponding block (CTU block) of the previous frame, such as the difference between the average energy, difference between the average pixel values, or difference between any parameters that can represent image contents of blocks, to determine whether the current frame and the previous frame involve scene change. If the difference between at least one block of the current frame and the corresponding block of the previous frame is too large, it means that the current frame and the previous frame involve scene change. When it is determined that the current frame and the previous frame involve scene change, the frame level processing circuit 110 discards α and β calculated in the previous frame (i.e. α and β after updating), and directly uses the preset α, β and formulas (3)-(5) to calculate the quantization parameter of the current frame.

Figure 2:
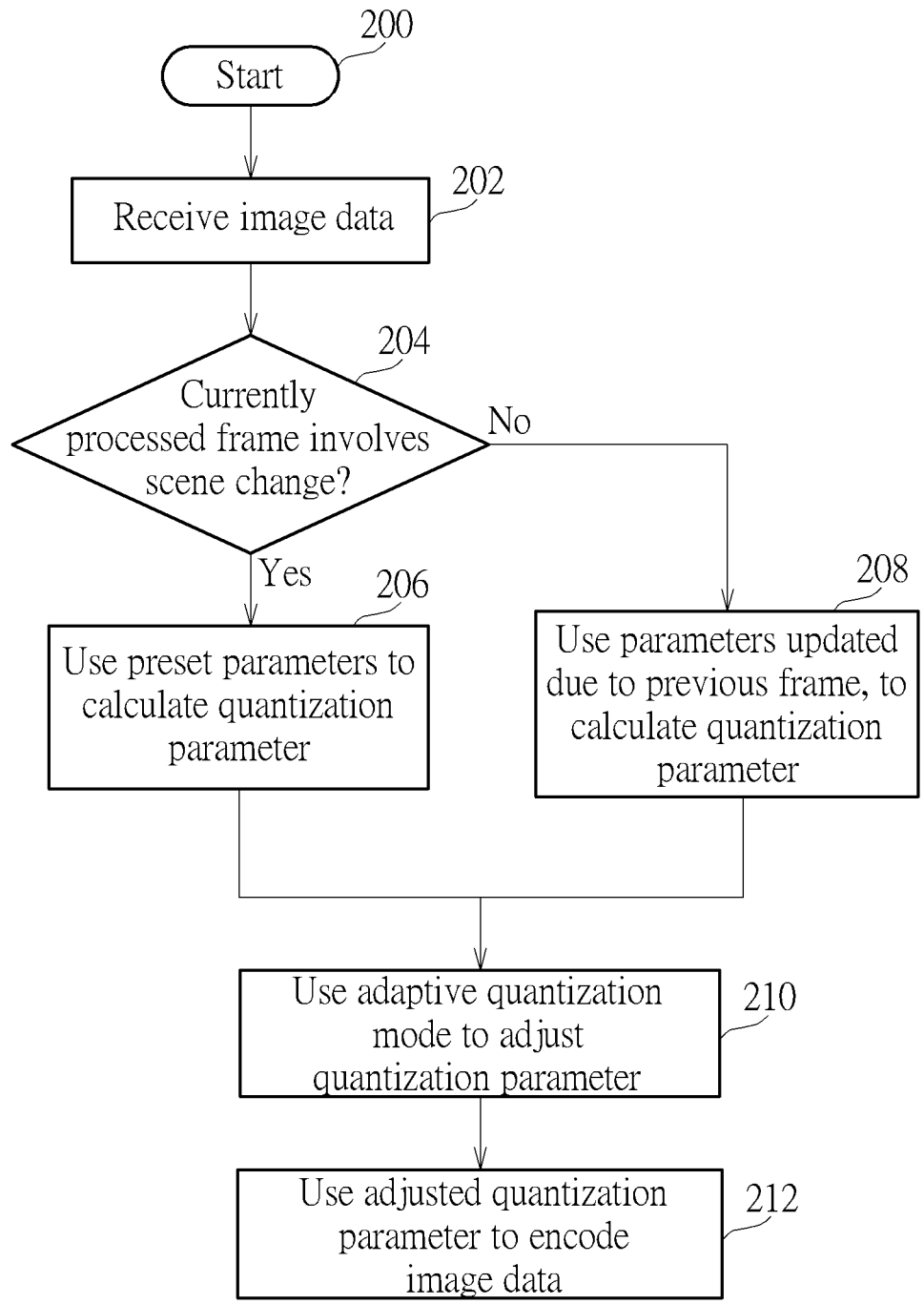
FIG. 2 is a flow chart illustrating a signal processing method employed by an encoder according to an embodiment of the present invention.

FIG. 2 is a flow chart of a signal processing method employed by an encoder according to an embodiment of the present invention. Please refer to FIG. 1 in conjunction with the content provided by the above embodiments. The flow of FIG. 2 is as follows.

Step 200: Start the flow.

Step 202: Receive the image data.

Step 204: Determine whether the currently processed frame involves scene change. If yes, the flow proceeds with Step 206; if no, the flow proceeds with Step 208.

Step 206: Use preset parameters to calculate the quantization parameter.

Step 208: Use parameters updated due to the previous frame, to calculate the quantization parameter.

Step 210: Use the adaptive quantization mode to adjust the quantization parameter.

Step 212: Use the adjusted quantization parameter to encode the image data.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An encoder, comprising:
a frame level processing circuit, arranged to calculate a bit number of a current frame according a frame rate and a target bitrate of the encoder, and calculate a quantization parameter of the current frame according to the bit number of the current frame and at least one parameter;
a coding tree unit (CTU) level processing circuit, coupled to the frame level processing circuit, and arranged to use an adaptive quantization mode to adjust the quantization parameter to generate an adjusted quantization parameter; and
an encoding circuit, coupled to the CTU level processing circuit, and arranged to encode the current frame to generate an output data according to the adjusted quantization parameter;

wherein if the current frame is an intra frame, the frame level processing circuit calculates a sum of intra costs of all blocks in the current frame, calculates a distributed bit number of the current frame according to the sum, the bit number of the current frame, and a first parameter, and calculates the quantization parameter according to the distributed bit number, the sum, the first parameter, and a second parameter; or wherein if the current frame is a predicted frame, the frame level processing circuit calculates the quantization parameter according to the bit number of the current frame, the first parameter, and the second parameter.

2. The encoder of claim 1, wherein the current frame comprises multiple blocks; for any block of the current frame, the CTU level processing circuit calculates a quantization parameter adjustment radix of the block of the current frame according to energy and a quantization parameter adjustment radix of a corresponding block of a previous frame and energy of the block, and adjusts the quantization parameter according to the quantization parameter adjustment radix of the block of the current frame, to obtain the adjusted quantization parameter corresponding to the block.

3. The encoder of claim 1, wherein the frame level processing circuit updates the first parameter or the second parameter for use in calculating the quantization parameter of a next frame.

4. The encoder of claim 3, wherein the frame level processing circuit or the CTU level processing circuit determines whether the next frame and the current frame involve scene change; if the next frame and the current frame involve scene change, the frame level processing circuit uses the first parameter and the second parameter to calculate the quantization parameter of the next frame; and if the next frame and the current frame do not involve scene change, the frame level processing circuit uses the first parameter after updating and the second parameter after updating to calculate the quantization parameter of the next frame.

5. A signal processing method applied in an encoder, comprising:
calculating a bit number of a current frame according to a frame rate and a target bitrate of the encoder;
calculating a quantization parameter of the current frame according to the bit number of the current frame and at least one parameter;
using an adaptive quantization mode to adjust the quantization parameter to generate an adjusted quantization parameter; and
according to the adjusted quantization parameter, encoding the current frame to generate an output data;
wherein if the current frame is an intra frame, calculating the quantization parameter of the current frame according to the bit number of the current frame and the at least one parameter comprises:
calculating a sum of intra costs of all blocks in the current frame;
calculating a distributed bit number of the current frame according to the sum, the bit number of the current frame, and a first parameter; and
calculating the quantization parameter according to the distributed bit number, the sum, the first parameter, and a second parameter; or
wherein if the current frame is a predicted frame, calculating the quantization parameter of the current frame according to the bit number of the current frame and the at least one parameter comprises:

calculating the quantization parameter according to the bit number of the current frame, the first parameter, and the second parameter.

6. The signal processing method of claim 5, wherein the current frame comprises multiple blocks, and using the adaptive quantization mode to adjust the quantization parameter to generate the adjusted quantization parameter comprises:

for any block of the current frame:
calculating a quantization parameter adjustment radix of the block of the current frame according to energy and a quantization parameter adjustment radix of a corresponding block of a previous frame and energy of the block; and
adjusting the quantization parameter to obtain the adjusted quantization parameter corresponding to the block according to the quantization parameter adjustment radix of the block of the current flame.

7. The signal processing method of claim 5, further comprising:
updating the first parameter and the second parameter for use in calculating the quantization parameter of a next frame.

8. The signal processing method of claim 7, further comprising:
determining whether the next frame and the current frame involve scene change;
if the next frame and the current frame involve scene change, using the first parameter and the second parameter to calculate the quantization parameter of the next frame; and
if the next frame and the current frame do not involve scene change, using the first parameter after updating and the second parameter after updating to calculate the quantization parameter of the next frame.

* * * * *